(12) United States Patent
Gromann et al.

(10) Patent No.: US 9,242,887 B2
(45) Date of Patent: Jan. 26, 2016

(54) METHOD AND APPARATUS FOR DRAWING A QUARTZ GLASS STRAND

(75) Inventors: Boris Gromann, Aschaffenburg (DE); Christian Neumann, Hungen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 241 days.

(21) Appl. No.: 13/981,874

(22) PCT Filed: Jan. 26, 2012

(86) PCT No.: PCT/EP2012/051198
§ 371 (c)(1),
(2), (4) Date: Jul. 25, 2013

(87) PCT Pub. No.: WO2012/101202
PCT Pub. Date: Aug. 2, 2012

(65) Prior Publication Data
US 2013/0305784 A1  Nov. 21, 2013

(30) Foreign Application Priority Data
Jan. 28, 2011 (DE) .......................... 10 2011 009 755

(51) Int. Cl.
C03B 17/04 (2006.01)
C03B 7/098 (2006.01)
C03B 5/033 (2006.01)

(52) U.S. Cl.
CPC .............. *C03B 7/098* (2013.01); *C03B 5/0336* (2013.01); *C03B 17/04* (2013.01)

(58) Field of Classification Search
None
See application file for complete search history.

(56) References Cited

U.S. PATENT DOCUMENTS 2,390,925 A * 12/1945 Danner ........................... 65/187
5,026,413 A * 6/1991 Lebert et al. .................. 65/29.13
(Continued)

FOREIGN PATENT DOCUMENTS

DE 10064977 C1 10/2002
DE 10216943 C1 6/2003
(Continued)

OTHER PUBLICATIONS

Watlow, "Application Guide: Electric Heaters", pp. 1-33, available online Nov. 30, 2010 per wayback machine.*
(Continued)

*Primary Examiner* — Lisa Herring
(74) *Attorney, Agent, or Firm* — Tiajoloff and Kelly LLP (57) ABSTRACT

In a known process for drawing a quartz glass strand, $SiO_2$ particles are fed to a melting crucible and softened therein to form a quartz glass mass, and the softened quartz glass mass is pulled vertically downward as a quartz glass strand via a drawing nozzle which is provided in the bottom region of the melting crucible and has a gap-like drawing nozzle opening. In order, on the basis thereof, to make it easier to reproducibly produce a quartz glass strand with a minor deviation from the nominal wall thickness profile, and in particular to avoid irregularly occurring indentations and protrusions of the wall thickness profile, it is proposed according to the invention that the wall thickness profile of the quartz glass strand is detected, and that the drawing nozzle is heated by means of a plurality of heating elements which are distributed around the drawing nozzle opening and can be electrically actuated independently of one another, and that the quartz glass mass is locally heated by means of the heating elements within the gap-like drawing nozzle opening depending on measurement results of the wall thickness profile.

16 Claims, 3 Drawing Sheets (56) References Cited

U.S. PATENT DOCUMENTS

| | | | |
|---|---|---|---|
| 6,098,428 A * | 8/2000 | Bogdahn et al. | 65/381 |
| 6,715,317 B1 | 4/2004 | Bräuer et al. | |
| 7,735,338 B2 | 6/2010 | Mueller et al. | |
| 7,891,213 B2 | 2/2011 | Bogdahn et al. | |
| 2004/0065115 A1 | 4/2004 | Mueller et al. | |
| 2007/0119214 A1 | 5/2007 | Bogdahn et al. | |
| 2007/0271963 A1 * | 11/2007 | Lange et al. | 65/439 |
| 2008/0184741 A1 | 8/2008 | Mueller et al. | |
| 2009/0064715 A1 * | 3/2009 | Horn et al. | 65/32.5 |
| 2011/0113829 A1 | 5/2011 | Leber et al. | |

FOREIGN PATENT DOCUMENTS

| | | |
|---|---|---|
| DE | 10357063 B3 | 4/2005 |
| DE | 102006011579 A1 | 9/2007 |
| DE | 102008009811 A1 | 8/2009 |
| DE | 102008030115 A1 | 12/2009 |
| EP | 0819655 B1 | 12/1999 |

OTHER PUBLICATIONS

Espacenet English language abstract of DE 102008009811 A1, published Aug. 20, 2009.
Espacenet English language abstract of DE 10216943 C1, published Jun. 26, 2003.
Espacenet English language abstract of DE 10064977 C1, published Oct. 2, 2002.
Espacenet English language abstract of DE 10357063 B3, published Apr. 21, 2005.
Espacenet English language abstract of EP 0819655 B1, published Dec. 8, 1999.

* cited by examiner

METHOD AND APPARATUS FOR DRAWING A QUARTZ GLASS STRAND

The present invention relates to a method for drawing a quartz-glass strand in that a crucible is fed with $SiO_2$ granules, said granules are softened therein to obtain a quartz glass mass and the softened quartz-glass mass is drawn off vertically downwards as a quartz-glass strand via a drawing nozzle which is provided in the bottom area of the crucible and has a gap-shaped drawing nozzle opening.

Furthermore, the present invention relates to an apparatus for drawing a quartz glass strand, comprising a crucible configured to receive $SiO_2$-containing start material, which is surrounded by a heating device for softening the start material, and a drawing nozzle which is provided in the bottom area of the crucible and includes a gap-shaped drawing nozzle opening.

Vertical crucible drawing methods are used for producing cylindrical components of quartz glass of any desired cross-sectional profile. $SiO_2$ granules are here molten as glass start material in a crucible to obtain a relatively highly viscous quartz glass mass (hereinafter also called "quartz glass melt") and are drawn off via a drawing nozzle on the crucible bottom as a quartz glass strand.

A gap-shaped drawing nozzle is particularly suited for drawing a tubular or a plate-shaped quartz glass strand. The basic task is here that the cross-sectional profile of the drawn-off quartz glass strand conforms to the nominal annular or rectangular profile. Deviations from the nominal profile are often caused by a non-ideal geometry, by contamination of or damage to the drawing nozzle, or by an inhomogeneous temperature distribution in the crucible or on the bottom outlet. Ordinary deviations in the case of a plate-shaped cross-sectional profile manifest themselves as a wedge shape, and in the case of annular cross-sectional profiles one observes wall lopsidedness in the case of which the maximum of the wall thickness is e.g. opposite to a minimum. However, several impressions or bulges of the tube wall or plate wall which are irregularly distributed over the circumference may also occur. Deviations of the wall profile from the nominal profile shall also briefly be called "wall thickness deviation" hereinafter.

PRIOR ART

DE 10 2006 011 579 A discloses a crucible pulling method in which a quartz glass mass softened in a crucible is drawn off vertically downwards in a continuous manner via a drawing nozzle inserted in a bottom opening of the crucible so as to obtain a hollow-cylindrical quartz-glass strand of a given profile. The drawing nozzle has an outer nozzle ring which defines a drawing nozzle opening into which a mandrel projects that is held on a hollow shaft through which a gas stream can be introduced into the inner bore of the quartz glass strand. The annular gap between the nozzle ring and the mandrel defines the profile of the tubular strand exiting out of the nozzle.

To reduce the risk of wall lopsidedness, one aims at a self-centering of the mandrel. This is accomplished in that the annular gap tapers from the top to the bottom, and that the mandrel is radially movably held inside the drawing nozzle opening. The radial movability of the mandrel can be ensured by way of horizontal displaceability or by way of a suspended mounting that permits a free oscillating movement of the mandrel in a direction perpendicular to the drawing axis.

Differences in the hydrostatic pressure of the quartz glass melt in the conically tapering annular gap produce forces on the movable mandrel and have a centering effect. Ordinary wall lopsidedness can thereby be reduced or avoided, but not impressions or bulges of the tube wall that are irregularly distributed over the circumference. Moreover, a long movable shaft and the free movability of the mandrel result in control instabilities and oscillating movements of the mandrel in the glass stream.

A crucible pulling method and an apparatus for producing a quartz glass strand according to the aforementioned type are known from DE 102 008 030 115 A. A crucible is fed with $SiO_2$ granules, these are softened therein to form a viscous quartz glass mass and said mass is drawn off vertically downwards as a cylindrical quartz glass strand through a drawing nozzle which is provided in the bottom area of the crucible and has a gap-shaped outlet. A cylindrical quartz-glass component is cut to length from the quartz glass strand.

When glass plates are produced for displays in a so-called "down-draw method", molten glass from a melting tank is supplied to a drawing tank and is drawn off downwards as a glass sheet or ribbon via a nozzle plate which is provided on the bottom side thereof and has a longitudinal slit. Such a method and a drawing furnace used therefor are known from DE 102 16 943 C1 and from DE 100 64 977 C1, respectively. The nozzle plate which consists of platinum is pressed by means of a nozzle holder from below against the drawing tank. Seals are arranged above and below the nozzle plate. Heating elements for heating the nozzle plate are inserted into the nozzle holder. In the region of the cooling path underneath the nozzle holder, cooling elements and further heating elements are provided and their temperature action on the drawn-off glass plate is homogenized by means of radiation plates. It is additionally provided that the heating elements can be controlled, and that multiple thermocouples are assigned to them for this purpose.

In the area of the cooling path the standard display glasses of alkali silicate glass can still be stretched plastically, so that an improved thickness distribution of the glass sheet can be achieved in vertical and lateral direction by a local heating or cooling of the glass sheet by segmented heating and cooling elements within the cooling path.

This, however, is not applicable to the manufacture of quartz glass cylinders. Although it is also known for the drawing of cylinders of quartz glass that separately controllable heating devices are used for the locally different heating of the drawn-off quartz-glass strand for the purpose of improving the wall thickness profile, as is e.g. known from EP 0 819 655 B1, it has been found that this way of locally heating or cooling the drawn-off quartz glass strand is not adequately effective.

TECHNICAL OBJECT

It is the object of the present invention to provide a method which facilitates the reproducible production of a quartz glass strand with a small deviation from the nominal wall thickness profile and which, in particular, is also suited for reducing irregularly occurring impressions and bulges of the wall thickness profile.

Furthermore, it is the object of the present invention to provide an apparatus which is suited for performing the method.

GENERAL DESCRIPTION OF THE INVENTION

As for the method, this object, starting from the above-mentioned method, is achieved according to the invention in that the wall thickness profile of the quartz glass strand is detected, and that the drawing nozzle is heated by means of a plurality of heating elements which are distributed around the drawing nozzle opening and are controllable independently of one another, and that the quartz glass mass is locally heated by means of the heating elements within the gap-shaped drawing nozzle opening in response to measurement results of the wall thickness profile.

In the method according to the invention, a drawing nozzle is used that can be heated, namely locally differently. To implement the angle-dependent inhomogeneous heating, separately controllable heating elements are used, so that the drawing nozzle can be heated in an angle-dependent and inhomogeneous manner. The drawing nozzle can thus be heated inhomogeneously or an existing, radially inhomogeneous temperature distribution of the drawing nozzle can be compensated by the additional heating of the heating elements, and an existing wall lopsidedness of a tubular quartz glass strand can thus be counteracted just like a wedge shape in the case of a plate-shaped quartz-glass strand. In hotter regions of the gap-shaped drawing nozzle one obtains a lower viscosity of the quartz glass, so that comparatively more quartz glass mass will exit there from the drawing nozzle than in colder regions.

It has been found that in the case of a strand of quartz glass the nozzle region is of central importance to the shaping by locally effective and angle-dependent inhomogeneous heating, but not the drawn-off strand underneath the drawing nozzle. This can be attributed to the fact that at drawing temperatures above 2000° C. the absolute temperature level as compared with the surroundings is very high so that upon exit of the quartz glass strand out of the drawing nozzle the cooling rate is higher and cooling takes place much faster than e.g. in the case of alkali silicate glasses or other technical glasses. This has the consequence that in the case of quartz glass the plastic zone underneath the drawing nozzle is very short, which restricts the effective influence on the shape by local temperature change. This also explains the low efficiency of the above-explained known shaping method.

Therefore, the drawing nozzle is additionally heated by means of the heating elements in the section in which the quartz glass strand has an excessively thin wall, and thus only indirectly also the quartz glass strand. To efficiently achieve either a locally different temperature in the area of the drawing nozzle or to compensate for a locally existing temperature difference, the heating elements are preferably arranged in the direct vicinity of the drawing nozzle. This, however, does not rule out that not only the drawing nozzle itself, but also a major part of or even the whole bottom portion of the crucible can be heated in a locally different manner. To determine the position of a minimum of the wall thickness, the wall thickness profile of the quartz glass strand is detected from time to time or continuously and the measurement results are evaluated for the actuation or control of the heating element arranged in the vicinity of the corresponding circumferential position or of a plurality of heating elements.

As an alternative to the local heating of the drawing nozzle with the aim to effect an increase in the wall thickness in the area of a wall thickness minimum, a local cooling of the drawing nozzle in the area of a wall thickness maximum could also be taken into consideration so as to reduce the wall thickness at that place. The local cooling, however, might lead to condensation of evaporated SiO and is therefore not preferred.

The drawing nozzle on the whole or at least the parts of the drawing nozzle that come into contact with the quartz glass melt normally consist of molybdenum, tungsten, iridium, rhenium or other high-melting metals or alloys.

The method according to the invention is suited for reducing ordinary wall thickness deviations, such as wall lopsidedness or wedge shape, and also for reducing wall thickness deviations irregularly occurring around the circumference of the drawn-off tube or plate strand. It follows from the above explanations that the method can also be used for selectively enforcing a deviation from the profile, which is predetermined by the drawing nozzle in actual fact, on the drawn-off quartz glass strand if this is desired.

The essential benefit of the invention is however that the drawing gap of the drawing nozzle can be heated locally differently by heating elements that can be adjusted independently of one another so as to eliminate the previously determined deviations in the wall thickness profile of the quartz glass strand.

It has turned out to be useful when position and amount of a wall thickness deviation of the quartz glass strand are determined, the position being used for selecting heating elements to be activated and the amount being used for regulating the heating temperature.

Deviations between the desired state of the wall thickness profile and the actual state are quantified, namely both with respect to the magnitude of the deviation and with respect to the relative local position thereof with respect to the circumference or the longitudinal extension of the drawing nozzle. A determined deviation from the desired geometry, such as e.g. a minimum of the wall thickness, is evaluated such that the local position of the minimum determines the location of the heating capacity to be locally increased, e.g. a heating element or heating elements to be activated there in addition, and the magnitude of the deviation determines the heating temperature thereof.

In a first preferred variant of the method, it is provided that the drawing nozzle is heated by means of a plurality of electrical resistance heating elements which are distributed around the drawing nozzle opening and are independent of one another.

To this end the electrical resistance heating elements are distributed around the circumference of the gap-shaped drawing nozzle, preferably evenly. In a gap-shaped drawing nozzle they are arranged inside the drawing-nozzle outer member or inner member or in the direct vicinity thereof. In the case of a longitudinally slotted drawing nozzle they are provided on the two longitudinal sides and preferably also on the two narrow sides. The heating capacity can be adjusted and regulated in an electrically simple way.

The local adaptation of the additional heating to a determined wall thickness profile will be the more accurate the greater the number of the heating elements distributed around the circumference of the drawing nozzle is. On the other hand, also with a selective additional heating a temperature distribution will be achieved—in response to the heat conductivity of the drawing nozzle material—that will also have an impact on neighboring regions and reduce the local resolution of the heating, and the constructional and controlling efforts will increase with the number of the heating elements. At least four, preferably at least eight and not more than twelve heating elements turn out to be a suitable compromise.

In a particularly preferred modification of the method according to the invention, it is provided that the drawing nozzle is heated by means of heating elements which are arranged in a common horizontal heating plane underneath the drawing-nozzle outer member.

This measure is structurally simple, and existing equipment can also be retrofitted. The heating elements are here in contact with the bottom side of the drawing-nozzle outer member or are arranged so close that a significant localized heat transfer can be observed.

As an alternative or in addition to the use of a plurality of resistance heating elements, a procedure in which inductively heatable heating elements are used has also turned out to be useful for the generation of the angle-dependent inhomogeneous heating of the drawing nozzle.

The electrically inductively heatable heating elements are designed as rods or tubes of conductive material, and they are surrounded by an induction coil. With the help of the high-frequency or medium-frequency induction coil a heating current is induced in the heating elements; they consequently serve as susceptors. To achieve a locally different, angle-dependent heating, they are axially or radially movable, so that they can be transported more or less into or out of the magnetic field of the induction coil. The susceptors project in an axially or laterally movable manner into the drawing nozzle, or they are—also axially or laterally movably—arranged directly underneath the drawing nozzle and they heat the drawing nozzle optionally primarily through heat radiation. The susceptors can be removed completely or in part, separated from one another, from the magnetic field of the induction coil. Depending on the size of the induced heating current and the distance of the susceptors from the drawing nozzle and the nozzle opening, locally different and angle-dependent temperatures are achieved in the area of the nozzle opening.

For drawing a tubular quartz glass strand a modification of the method according to the invention has turned out to be useful where a drawing nozzle is used that comprises an outer member with the drawing nozzle opening and an inner member projecting into the drawing nozzle opening while leaving an annular gap, the quartz glass mass being drawn off through the annular gap vertically downwards as a tubular quartz glass strand and being locally heated by means of the heating element within the annular gap in response to the measurement results of the wall thickness profile.

The drawing nozzle is additionally heated by means of the heating elements in the circumferential section in which the tubular quartz-glass strand comprises an excessively thin wall. To determine the circumferential position of the minimum of the wall thickness, the cross-sectional geometry of the quartz glass strand is determined from time to time or continuously and the measurement result is evaluated for the actuation or control of the heating element or heating elements arranged in the vicinity of the corresponding circumferential position. When several heating elements are used, these are preferably evenly distributed around the circumference of the drawing nozzle and are arranged for this purpose within the drawing-nozzle outer member and/or within the drawing-nozzle inner member or in the direct vicinity thereof.

In this connection it has turned out to be useful when the drawing-nozzle inner member is shifted in horizontal direction within the drawing nozzle opening in response to the measurement results of the wall thickness profile.

This measure may turn out to be helpful as an additional measure for the additional heating of the drawing nozzle. A part, preferably the greatest part, of the wall thickness deviation can be compensated by shifting the drawing-nozzle inner member. The rest of the wall thickness deviation remaining after the shifting of the drawing-nozzle inner member is further reduced or eliminated by means of the additional heating of the drawing nozzle according to the invention. For this purpose the cross-sectional geometry of the quartz glass strand is detected from time to time or continuously and the measurement results are passed on to an evaluation and control device that evaluates and controls both the shifting device for the drawing-nozzle inner member and the control of the heating element or heating elements arranged in the vicinity of the corresponding circumferential position.

The method according to the invention has turned out to be particularly useful when a tubular quartz-glass strand is used with an outer diameter of 100 mm or more.

It has been found that it gets more and more difficult during drawing of quartz glass tubes with a rising ratio of outer diameter and wall thicknesses to observe the nominal wall thickness and to avoid wall thickness deviations. Such instabilities, which particularly arise at wall thicknesses of less than 3 mm, can be counteracted in a targeted manner in the method according to the invention by the additional heating of the drawing nozzle.

As for the apparatus, the above-mentioned object, starting from an apparatus of the aforementioned type, is achieved according to the invention in that a measuring device is provided for detecting the wall thickness profile of the quartz glass strand, and that the drawing nozzle is heatable by means of a plurality of heating elements which are distributed around the drawing nozzle opening and are electrically controllable independently of one another in response to measurement results of the wall thickness profile.

The apparatus according to the invention comprises a drawing nozzle which is locally heatable by means of separately controllable heating elements in a locally different manner. The drawing nozzle can thereby be heated in an angle-dependent inhomogeneous manner or an existing inhomogeneous temperature distribution of the drawing nozzle can be compensated by the additional heating of the heating elements and an existing wall thickness deviation of the quartz glass strand can thereby be counteracted.

For this purpose preferably at least four, particularly preferably at least eight heating elements are distributed around the circumference of the drawing nozzle—preferably evenly. The heating elements can be electrically controlled and heated separately and are connected for this purpose to an evaluation and control device which comprises a measuring device for the continuous detection of the wall thickness profile of the quartz glass strand and by means of which the position and amount of a wall thickness deviation of the quartz glass strand is continuously determined. A determined deviation from the desired geometry in the wall thickness profile, e.g. a minimum of the wall thickness, is evaluated such that the local position of the minimum defines the heating element or heating elements to be activated, and the magnitude of the deviation defines the heating temperature thereof.

The mean temperature increase also depends on the heating capacity of the heating elements. Preferably, the heating elements are designed for a nominal heating capacity of at least 100 W.

In the case of typical drawing-nozzle dimensions and flow rates an increase in the wall thickness of the quartz glass strand by at least 0.1 mm is achieved at this heating capacity.

This apparatus is particularly useable for performing the method according to the invention in the procedure using a plurality of heating elements.

Advantageous configurations of the apparatus according to the invention become apparent from the sub-claims. If configurations of the apparatus indicated in the sub-claims copy the procedures mentioned in sub-claims with respect to the method according to the invention, reference shall additionally be made for a supplementary explanation to the above statements on the corresponding method claims.

The invention will now be described in more detail with reference to embodiments and a drawing. The drawing is a schematic illustration showing in detail in.

Figure 1:
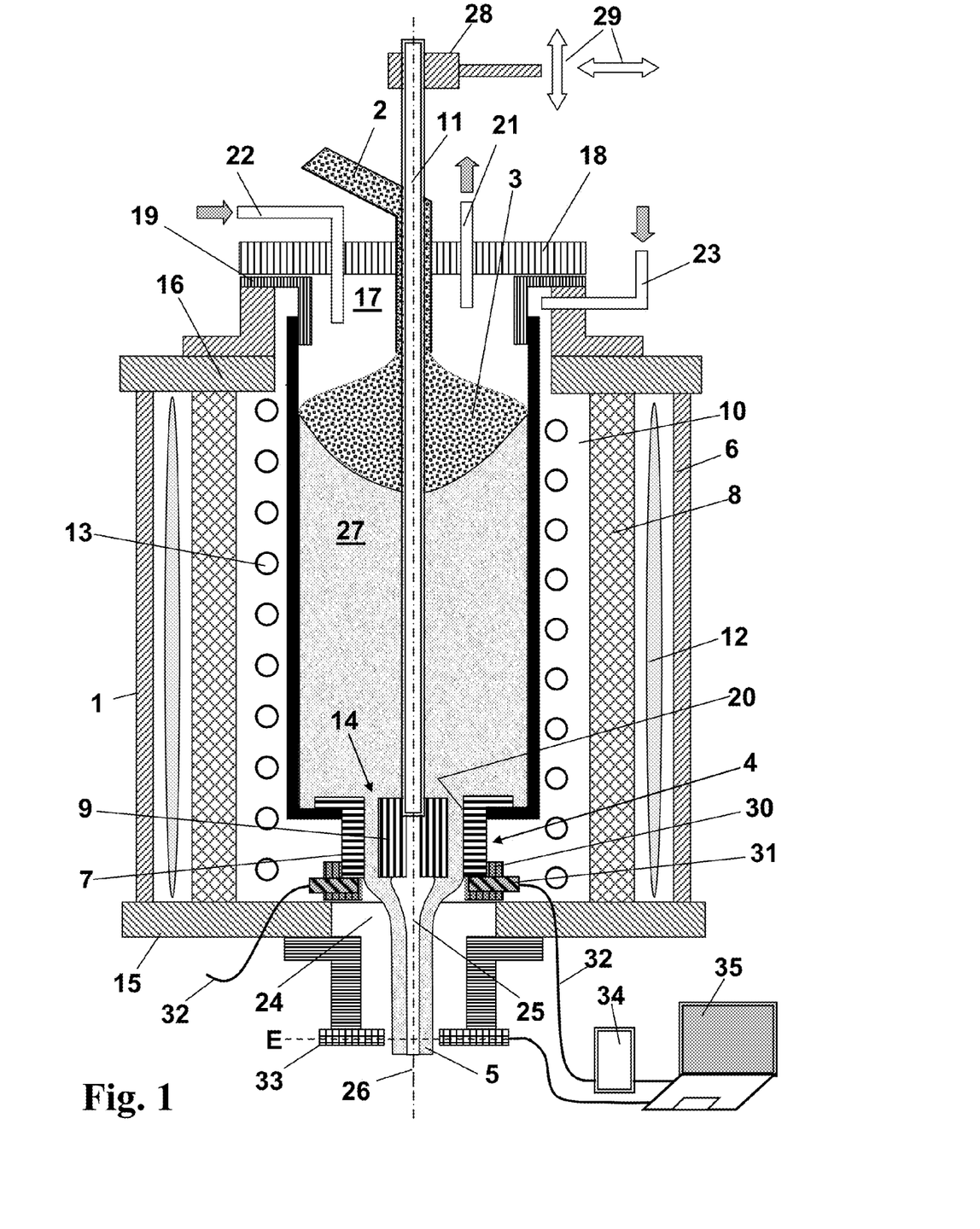
FIG. 1 an embodiment of the apparatus according to the invention in the form of a drawing furnace with a locally heatable drawing nozzle in a side view.

The drawing furnace according to FIG. 1 comprises a crucible 1 of tungsten into which $SiO_2$ granules 3 are continuously filled from above via a feed nozzle 2.

The crucible 1 is surrounded by a water-cooled (12) furnace jacket 6 so as to form a protective gas chamber 10 which is purged with protective gas and inside which a porous insulation layer 8 of oxidic insulation material and a resistance heater 13 for heating the crucible 1 are accommodated. The protective gas chamber 10 is open downwards and is otherwise sealed with a bottom plate 15 and with a cover plate 16 to the outside. The crucible 1 encloses a crucible interior 17 which is also sealed relative to the surroundings by means of a cover 18 and a sealing element 19.

A drawing nozzle 4 of tungsten is provided in the bottom area of the crucible 1. Said nozzle is composed of a nozzle ring 7 which is inserted into the bottom of the crucible 1, and of a mandrel 9 which is coaxially held in the nozzle opening 20 of the nozzle ring 7. The mandrel 9 comprises a frusto-conical outer sheath tapering upwards. An annular gap 14 which tapers off from the top to the bottom and through which the soft quartz-glass mass 27 is drawn off as a tubular strand 5 downwards in the direction of the drawing axis 26 is therefore formed between nozzle ring 7 and mandrel 9.

The outer diameter of the nozzle opening 7 is 210 mm. The annular gap 14 of the drawing nozzle 4 has a length of 100 mm.

The mandrel 9 of the drawing nozzle 4 is connected to a holding tube 11 of tungsten that extends through the quartz glass mass 27 and is guided out of the crucible interior 17 via the cover 18. The holding tube 11 is distinguished by a high bending stiffness which prevents the amplification of an oscillating movement in the stream of the quartz glass mass. Apart from holding the drawing-nozzle inner member 9, the holding tube 11 also serves to supply a process gas for setting a predetermined blowing pressure in the inner bore of the tubular strand 5. To this end the process gas is supplied to a through hole 25 formed in the mandrel 9.

The upper end of the holding tube 11 which projects out of the melting furnace 1 is connected to a schematically illustrated height-adjusting and shifting device 28 which, apart from the height adjustment of the mandrel 9, also permits shifting in lateral direction, as outlined by the directional arrows 29. The height-adjusting and shifting device 28 is connected to an evaluation and control device 35.

An inlet 22 and an outlet 21 for a crucible interior gas in the form of pure hydrogen project through the cover 18. Likewise, the protective gas chamber 10 is provided in the upper portion with a gas inlet 23 for pure hydrogen which can escape via the bottom opening 24.

The lower end of the nozzle ring 7 which projects out of the melting furnace 1 is provided with an external thread onto which a holding ring 30 of tungsten is screwed. The holding ring 30 is provided with eight, radially extending blind holes that are evenly distributed over the circumference of the holding ring 27, each serving to accommodate a heating element 31. A fixedly predetermined circumferential position on the nozzle ring 7 is assigned to each of the eight heating elements 31. The heating elements 31 are moved into the direct vicinity of the lower edge of the nozzle ring 7 by screwing on the holding ring 27 and are fixed in their addressed circumferential position.

The heating elements 31 are resistance heating elements with heating coils of tungsten with a nominal heating capacity of 500 W. The electrical connection is designated with reference numeral 32. The heating elements 31 are connected through a furnace control 34 to the evaluation and control device 35.

In a horizontal measuring plane "E" underneath the crucible 1, the radial wall thickness profile of the drawn-off tubular strand 5 of quartz glass is detected by means of a wall-thickness measuring device 33 which is rotatable around the outer circumference of the tubular strand 5 of quartz glass and which is also connected to the evaluation and control device 35.

Figure 2:
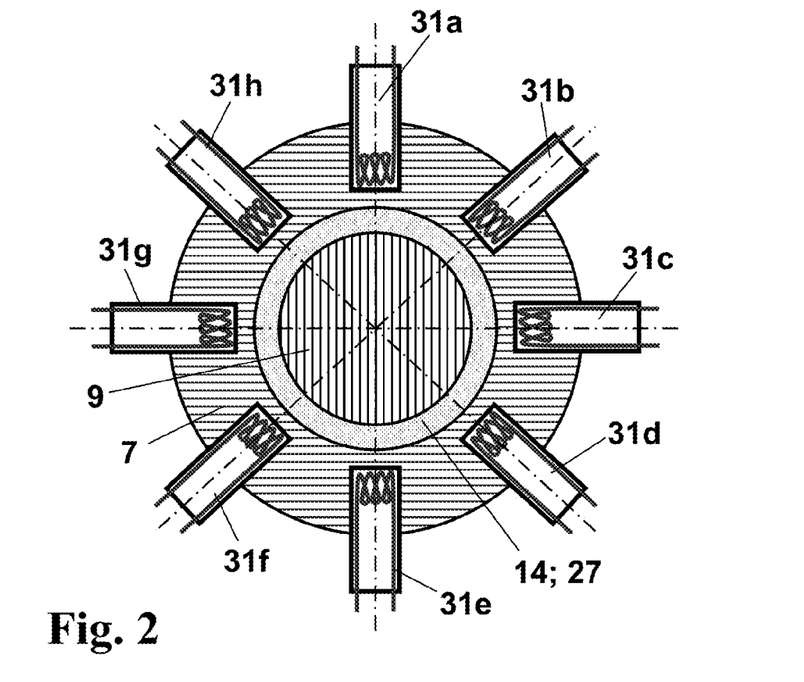
FIG. 2 the drawing nozzle of FIG. 1 in a top view (from below) in combination with a heating element configuration.

FIG. 2 is a schematic and enlarged top view illustrating the bottom side of the drawing nozzle 4 with the eight heating elements 31 (but without the holding ring 30). As can be seen, the heating elements 31 comprise a heating coil and a power connection. They are distributed in a common horizontal plane underneath the crucible 1 evenly around the annular gap 14 filled with quartz glass melt 27 and on the bottom side of the nozzle ring 7, respectively.

The method according to the invention will now be explained in more detail hereinafter with reference to an embodiment.

$SiO_2$ granules 3 are continuously fed via the feed nozzle 2 into the crucible 1 and are heated therein to a temperature of about 2100° C. to 2200° C. A homogeneous and bubble-free quartz-glass melt 27 is here formed in the lower portion of the crucible 1, with a grain layer of $SiO_2$ particles 3 floating on said melt 27. The softened quartz-glass mass 27 flows out via the drawing nozzle 4 and is drawn off at a controlled drawing speed in the form of the tubular quartz-glass strand 5 with a desired outer diameter of 200 mm and a desired wall thickness of 7.5 mm.

The tubular strand 5 of quartz glass is here passed through a sliding contact ring which simultaneously serves as a guide rail for the wall-thickness measuring device 33 which is rotating around the outer circumference of the tubular strand 5 and by means of which a wall thickness profile of the drawn-off tubular strand 5 of quartz glass is determined during the drawing process, and this is evaluated with the help of the evaluation and control unit 35.

Figure 3:
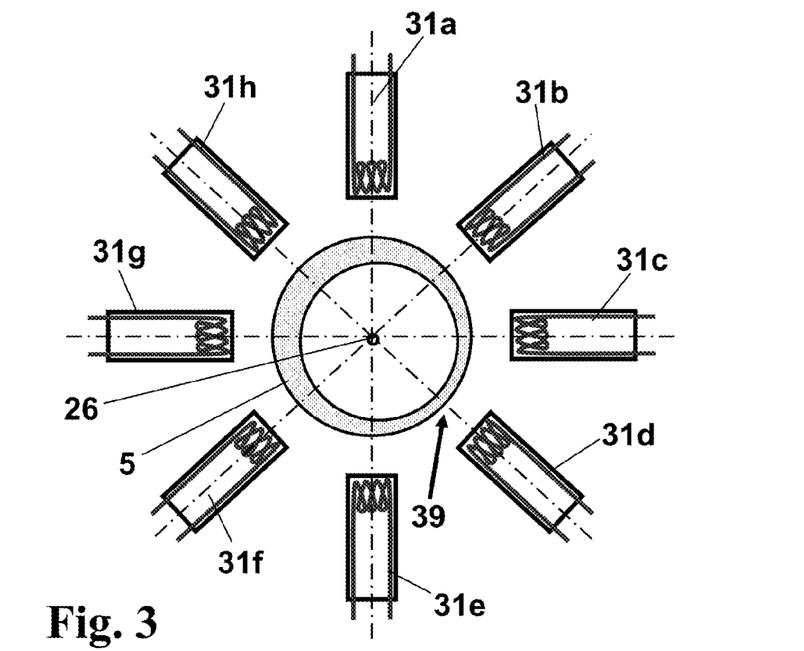
FIG. 3 a wall thickness profile of a drawn-off tubular strand 5 with respect to the heating element configuration of FIG. 2.

A wall thickness profile of the drawn-off tubular strand 5, as is measured in a measuring plane "E" by means of the wall-thickness measuring device 33, and the spatial orientation thereof relative to the configuration of the heating elements 31 is schematically shown in FIG. 3. It is evident that the cross-sectional profile of the tubular strand 5 perpendicular to the drawing axis 26 (vertically extending relative to the sheet plane) shows pronounced wall lopsidedness. The minimal wall thickness, marked by the directional arrow 39, is in the embodiment in the sector field at the right side, bottom, in the circumferential area of the heating element 31d.

The wall thickness profile of the drawn-off tubular strand 5 is evaluated by means of the evaluation and control unit 35 in the manner that the amount of the wall lopsidedness (=maximum value minus minimum value of the wall thickness; in the embodiment: 7.5 mm) and the position of the minimum wall thickness relative to the heating element configuration is detected. On the basis of the deviation of the wall thickness distribution from the ideal geometry, as is thereby determined, the heating elements 31 which are positioned in the circumferential region of the minimum of the wall thickness are additionally heated. In the embodiment the heating element 31$d$ is operated at a heating capacity of 400 W, the two neighboring heating elements 31$c$ and 31$e$ at a heating capacity of 200 W, the heating elements 31$b$ and 31$f$ at 100 W and the heating elements 31$a$ and 31$g$ at 50 W. The heating element 31$h$ is not operated. This type and distribution of the additional heating effects an additional heating up of the nozzle ring 7 of the drawing nozzle 4 with a maximum of the heating action in the area of the heating element 31$d$, so that the quartz glass flowing therethrough is given a lower viscosity in the circumferential area of the heating elements 31$d$, 31$c$, and 31$e$—and to a lesser degree in the area of the heating elements 31$a$ and 31$g$. This increases the flow rate of the quartz glass stream in this circumferential area and leads to an increase in the wall thickness in this area, which reduces the measured wall lopsidedness. As a rule of thumb, it can be assumed that an additional heating capacity of 500 W in one of the heating elements 31 in the operative area thereof leads to an increase in the wall thickness of about 1 mm.

The tubular strand 5 of quartz glass is further removed and the action of the performed temperature increase in the drawing nozzle 4 on the profile of the wall thickness of the removed tubular strand 5 is continuously monitored by means of the wall-thickness measuring device 33. If necessary, the heating capacity of the heating elements 31$c$-31$e$ is adapted for such a long time that a satisfactorily accurate cylinder symmetry of the drawn-off tubular strand 5 is obtained.

The drawn-off tubular strand 5 of quartz glass is cut into quartz-glass tubes having a length of 3.0 m.

Figure 4:
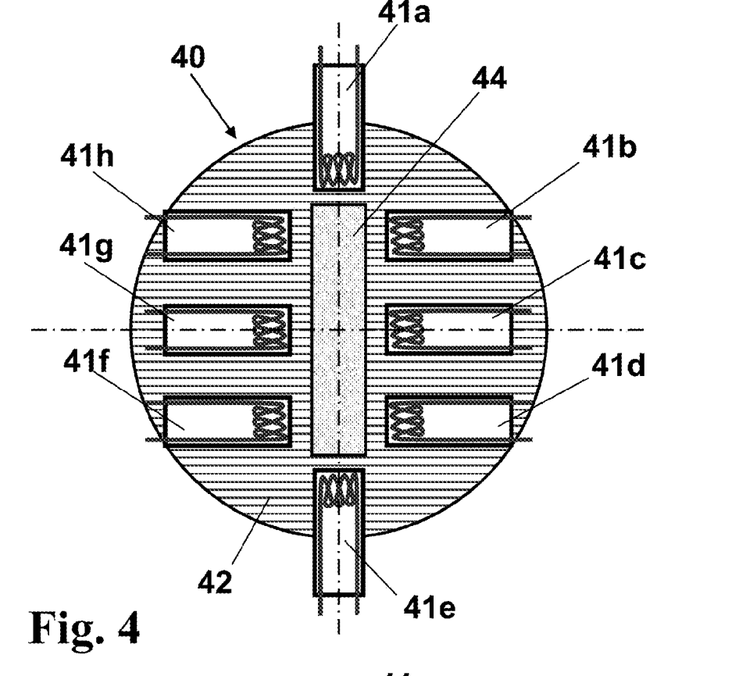
FIG. 4 a longitudinally slotted drawing nozzle in a top view (from below) in combination with a heating element configuration.

FIG. 4 is a schematic top view on the bottom side of a drawing nozzle 40 for drawing a plate-shaped quartz-glass strand. The outer diameter of the nozzle base body 42 is 400 mm and its height is 100 mm and it fits into a crucible 1, as described above with reference to FIG. 1. The elongated drawing gap 44 has a gap width of 8 mm and a length of 315 mm on the bottom side of the drawing nozzle 40. The quartz glass plate to be produced by using the drawing nozzle 40 has a thickness of about 8 mm and a width of about 315 mm in conformity with the dimensions of the drawing gap 44.

Eight heating elements 31 are arranged around the drawing gap 44 and in contact with the bottom side of the drawing nozzle 40. A first row with the heating elements 41$b$, 41$c$, and 41$d$ is here arranged on the one longitudinal side of the drawing gap 44, and a second row with the heating elements 41$f$, 41$g$ and 41$h$ is arranged on the opposite longitudinal side, each offset with respect to the heating elements of the first row. A heating element 41$a$, 41$e$ is respectively provided on the narrow sides of the drawing gap 44.

Figure 5:
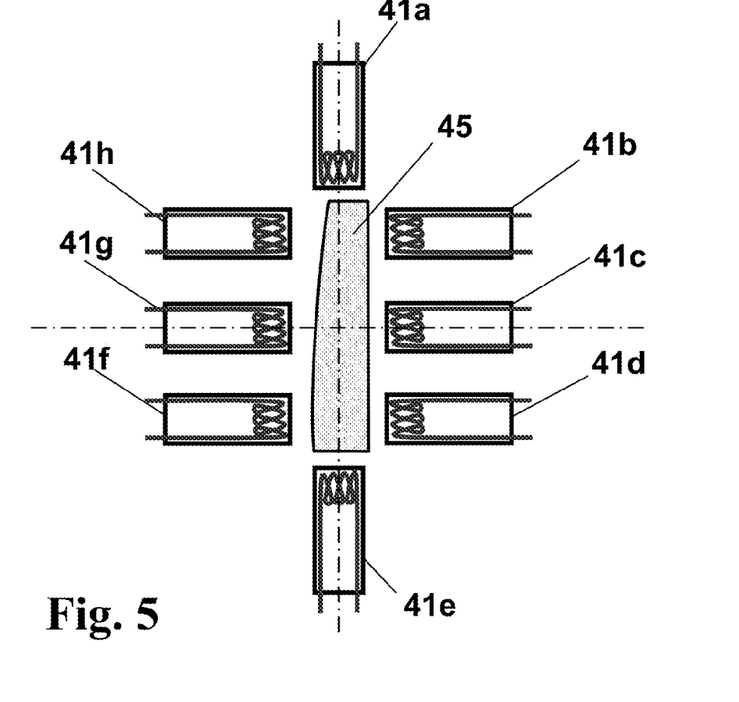
FIG. 5 a wall thickness profile of a drawn-off plate-type strand with respect to the heating element configuration of FIG. 4.

A cross-sectional profile of a plate-shaped tubular strand 45 drawn off via the drawing gap 44 is schematically shown in FIG. 5. As can be seen, the cross-sectional profile has a pronounced wedge shape in a direction perpendicular to the drawing axis.

The wall thickness profile of the drawn-off strand 45 is evaluated by means of the evaluation and control unit such that the amount of the wall lopsidedness and the position of the minimum wall thickness relative to the heating element configuration are detected. On the basis of the deviation of the wall thickness distribution from the ideal geometry, as determined in this way, the heating elements 41 which are positioned in the circumferential area of the minimum of the wall thickness are additionally heated.

In the embodiment the minimum wall thickness lies in the sector field at the left side, top, namely in the circumferential area of the heating element 41$a$ and 41$h$. These are operated at a heating capacity of 400 W, and the neighboring heating element 41$g$ at a heating capacity of 200 W. The remaining heating elements are not used.

This type and distribution of the additional heating leads to an additional local heating of the base body 42 of the drawing nozzle (FIG. 4) and a relative temperature increase with a maximum in the area of the heating elements 41$h$ and 41$a$, so that the quartz glass flowing therethrough is given a lower viscosity in the circumferential area of these heating elements and the flow rate of the quartz glass stream is thereby increased in this circumferential area. This leads to an increase in the wall thickness in this area, which reduces the measured wedge shape of the quartz glass strand 45.

The drawn-off quartz glass strand 45 is cut into quartz glass plates having a length of 2.0 m.

In an alternative embodiment of the method according to the invention, inductively heatable susceptors in the form of molybdenum tubes are provided instead of the electrical resistance heating elements. The screwed-on holding ring 30 consists here of a slotted copper plate with an outer diameter of 300 mm and presses a flange of zirconium-oxide ceramics against the bottom side of the drawing nozzle 4. The zirconium-oxide flange has a diameter of 460 mm and projects beyond the nozzle base body by about 30 mm. Eight bores are formed in the projecting annular portion in the direction of the longitudinal axis 26 and one of the molybdenum tubes is respectively inserted into said bores from above or from below in an axially movable manner.

The zirconium-oxide flange is surrounded by a high-frequency induction coil. As long as and to the extent that the molybdenum tubes are positioned in the magnetic field of the induction coil, they act as susceptors and heat the abutting drawing nozzle 4. The susceptors are evenly distributed around the drawing nozzle and can be removed from the magnetic field of the induction coil independently of one another by withdrawing them out of their bore. The more a susceptor is removed from the magnetic field, the smaller is its contribution to the heating of the drawing nozzle 4 in this area and the drawing nozzle opening 14. The quartz glass mass 27 is thereby heated in a locally inhomogeneous manner by means of the drawing nozzle 4 and within the drawing nozzle opening 14 in response to the measurement results of the wall thickness profile determined on the quartz glass strand 5, as has been explained above with reference to the use of electrical heating burners. The electrical heating burners can be dispensed in this variant of the method.

The invention claimed is:
1. A method for drawing a quartz-glass strand, said method comprising:
feeding a crucible with $SiO_2$ granules,
softening said granules therein to obtain a quartz glass mass,
drawing off the softened quartz-glass mass vertically downwards as a quartz-glass strand via a drawing nozzle, said nozzle being provided in a bottom area of the crucible and having a drawing nozzle opening,
detecting a wall thickness profile of the quartz glass strand,
heating the drawing nozzle using a plurality of heating elements which are distributed around the drawing nozzle opening and are electrically controllable independently of one another, and heating the quartz glass mass locally with the heating elements within the drawing nozzle opening in response to measurement results of the wall thickness profile; and wherein a position and an amount of a wall thickness deviation of the quartz glass strand are determined, the determined position being used to determine which of the heating elements is activated and the determined amount being used to regulate a heating temperature thereof.

2. The method according to claim 1, wherein the plurality of heating elements comprises at least four heating elements.

3. The method according to claim 1, wherein the heating elements that heat the drawing nozzle are arranged in a common horizontal heating plane underneath the drawing nozzle.

4. The method according to claim 1, wherein the heating elements are electrical resistance heating elements.

5. The method according to claim 1, wherein the heating elements are inductively heatable heating elements.

6. The method according to claim 1, wherein the drawing nozzle comprises an outer member defining the drawing nozzle opening and an inner member projecting into the drawing nozzle opening so as to define an annular gap, the quartz glass mass is drawn off through the annular gap vertically downwards as a tubular quartz-glass strand, and being heated by the heating elements within the annular gap responsive to the measurement results of the wall thickness profile.

7. The method according to claim 6, wherein the drawing-nozzle inner member is shifted within the drawing nozzle opening in a horizontal direction responsive to the measurement results of the wall thickness profile.

8. The method according to claim 6, wherein the quartz glass strand is a tubular quartz glass strand with an outer diameter of 100 mm or more.

9. The method according to claim 1, wherein the plurality of heating elements comprise at least eight and not more than twelve heating elements.

10. An apparatus for drawing a quartz glass strand, said apparatus comprising:

a crucible configured to receive $SiO_2$-containing start material, a heating device surrounding said crucible and configured to soften the $SiO_2$-containing start material, a drawing nozzle which is provided in a bottom area of the crucible and having a drawing nozzle opening, a measuring device configured to detect a wall thickness profile of the quartz glass strand, and a plurality of heating elements configured to heat the drawing nozzle, said heating elements being distributed around the drawing nozzle opening and being electrically controllable independently of one another responsive to measurement results of the wall thickness profile; and wherein the measuring device is configured to determine a position and an amount of wall lopsidedness of the quartz glass strand, and wherein the apparatus further comprises an evaluation and control device configured to evaluate the position of wall lopsidedness and to determine which of the heating elements are activated based on said position and to evaluate the amount of wall lopsidedness and to control the heating temperature of said heating element or elements based on said amount.

11. The apparatus according to claim 10, wherein the plurality of heating elements comprises at least four heating elements within the drawing-nozzle outer member.

12. The apparatus according to claim 10, wherein the heating elements are arranged in a common horizontal heating plane underneath the drawing nozzle.

13. The apparatus according to claim 10, wherein the drawing nozzle comprises an outer member with the drawing nozzle opening and an inner member projecting into the drawing nozzle opening so as to leave an annular gap therearound, and wherein the heating elements are activatable responsive to the measurement results of the wall thickness profile.

14. The apparatus according to claim 13, wherein the drawing-nozzle inner member is displaceable in a horizontal direction within the drawing nozzle opening in response to detection of the wall thickness profile.

15. The apparatus according to claim 10, wherein the heating elements are configured for a nominal heating capacity of at least 100 W.

16. The apparatus according to claim 10, wherein the plurality of heating elements comprise at least eight and not more than twelve heating elements within the drawing nozzle outer member.

* * * * *